United States Patent [19]

Hopp

[11] 4,241,491
[45] Dec. 30, 1980

[54] METHOD OF INSTALLING CAPTIVE TYPE SPARK PLUG GASKET WITH LOW PROFILE LOCKING TABS

[76] Inventor: Harold P. Hopp, 35 Industrial Rd., Lodi, N.J. 07644

[21] Appl. No.: 36,132

[22] Filed: May 4, 1979

[51] Int. Cl.³ .................. B21D 39/00; B23P 11/00
[52] U.S. Cl. ........................... 29/511; 29/520; 277/236
[58] Field of Search ............. 29/511, 520, 243.52; 277/236

[56] References Cited

U.S. PATENT DOCUMENTS

| 3,099,456 | 7/1963 | Hopp | 29/520 UX |
|---|---|---|---|
| 3,156,477 | 11/1964 | Hopp | 29/520 UX |
| 3,181,584 | 5/1965 | Borowsky | 29/511 X |
| 3,299,504 | 1/1967 | Hopp | 29/520 X |
| 3,332,141 | 7/1967 | Hopp | 29/520 |
| 4,168,839 | 9/1979 | Hopp et al. | 277/236 X |

Primary Examiner—Charlie T. Moon
Attorney, Agent, or Firm—Charles E. Temko

[57] ABSTRACT

An improved locking type spark plug gasket in which the locking lugs are of such configuration as to lie within the vertical height of the sealing folds of the gasket. The configuration especially adapts it to receive a synthetic resinous coating applied after manufacture, and facilitates installation on that type of spark plug having an undercut area at the base of the threaded shank portion thereof.

2 Claims, 4 Drawing Figures

U.S. Patent     Dec. 30, 1980     4,241,491
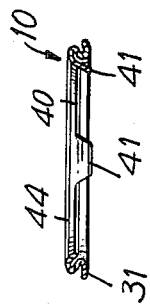
FIG. I
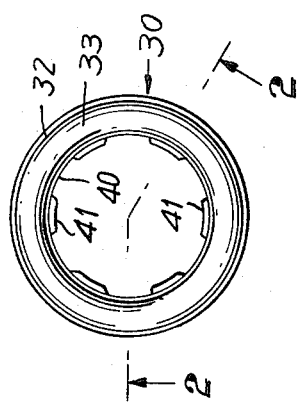
FIG. 2
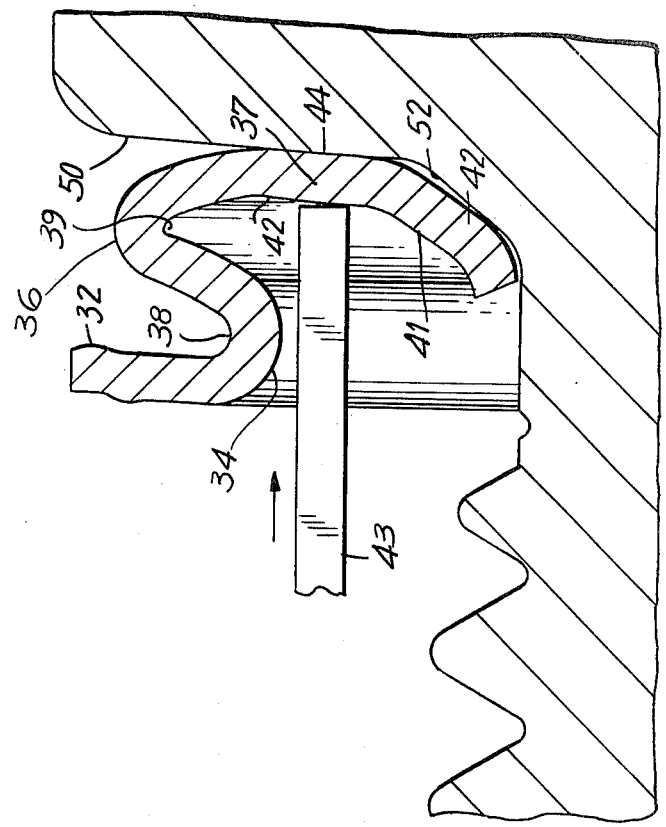
FIG. 4
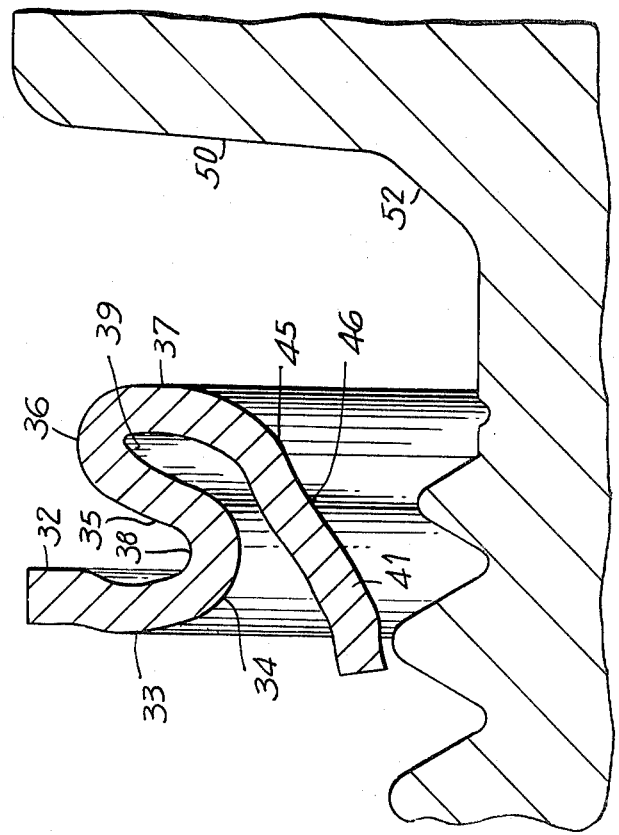
FIG. 3

METHOD OF INSTALLING CAPTIVE TYPE SPARK PLUG GASKET WITH LOW PROFILE LOCKING TABS

BACKGROUND OF THE INVENTION

This invention relates generally to the field of captive type spark plug gaskets, and more particularly to an improved type offering several significant advantages over the prior art.

In my prior U.S. Pat. No. 4,064,612, there is disclosed a captive type spark plug gasket and a tool for staking the gasket onto the threaded shank of a spark plug body. This construction is particularly suited to that type of plug in which the shank is threaded throughout its entire length, without the provision of an undercut at the base thereof where it joins the main portion of the plug body. This patent teaches the necessity of staking the gasket in such manner that the locking lugs are deformed against the threads, and the portions of the gasket performing the sealing functions are not disturbed. In the case of spark plug bodies having the undercut portion on the shank, the industry has used the type of gasket disclosed in my prior U.S. Pat. No. 3,299,504. In this type of gasket, the locking flange which is deformed into the undercut area projects longitudinally outwardly of the S-folded sealing element, resulting in a gasket of substantially greater longitudinally height, and also resulting in an S-fold construction in which the interstices between the sealing members are so narrow that when the gasket is immersed in a synthetic resinous coating material, the material does not flow readily into the interstice by capillary action, and thus with compression of the S-fold on installation, and subsequent distortion, a potential uncoated area is exposed.

With resort to mechnization for installing the gaskets on the plug bodies, the desirability of lowering the profile of the gaskets to facilitate orientation by hoppers feeding chutes which supply the gaskets to upturned plug bodies becomes apparent. Thus, the configuration shown in my U.S. Pat. No. 3,299,504 has become undesirable. The configuration disclosed in my U.S. Pat. No. 4,064,612 is preferable, but in the disclosed form, it is not suitable for use with an undercut shank, because the degree of radially inward movement of the locking lugs under the action of the staking tool is far less than adequate. In the case of a fully threaded shank, the requirement is relatively small with respect to inward movement, and high with respect to required mechanical force, owing to the necessity of at least partially conforming the locking tab to the threaded surface of the shank.

SUMMARY OF THE INVENTION

Briefly stated, the invention contemplates the provision of an improved captive type spark plug gasket in which the locking tabs are positioned to be radially inwardly moved as the result of mechanical distortion imparted to the inner edge of one of the radially inwardly extending sealing members. This is accomplished by attaching the locking tabs to a member, the surface of which is adjacent to the undersurface of the plug body, that is to say, furthest from the cylinder head, whereby the locking tabs are disposed in the circular recess formed by the S-fold sealing element, to provide the lowest possible profile, significantly lower than that disclosed in my U.S. Pat. No. 3,299,504. Additionally, the height of the sealing member is no longer limited to the industry prescribed 0.065 inch nominal, thereby permitting the S-fold element in uncompressed condition to offer interstices in the folds sufficiently wide to readily accept a synthetic resinous coating composition.

BRIEF DESCRIPTION OF THE DRAWING

In the drawings, to which reference will be made in the specification, similar reference characters have been employed to designate corresponding parts throughout the several views.

FIG. 1 is a top plan view of an embodiment of the invention.

FIG. 2 is a longitudinal central sectional view thereof, as seen from the plane 2—2 in FIG. 1.

FIG. 3 is an enlarged fragmentary sectional view as seen from the plane 3—3 in FIG. 2.

FIG. 4 is an enlarged fragmentary sectional view showing the step of staking the disclosed embodiment upon a spark plug body.

DETAILED DESCRIPTION OF THE DISCLOSED EMBODIMENT

In accordance with the invention, the device, generally indicated by reference character 30, is manufactured in conventional manner from sheet steel stock by progressive drawing operations, which are well-known in the art, and need not be further considered herein. As known in the art, a sealing portion includes a first sealing member 31, including a planar peripheral portion 32, and an arcuate portion 33. The member 31 is interconnected by a bent portion 34 to a second sealing member 35, which, in uninstalled condition is disposed at substantially a 45° angle with respect to the general plane of the device. A second bent portion 36 interconnects with a third sealing member 37 which is also somewhat arcuate in configuration. It will be observed that the first and second interstices 38 and 39, respectively, formed by the bent portions 34 and 36 are sufficiently wide that there is no difficulty in flowing the synthetic resinous coating composition thereinto at a final stage of manufacture.

The third sealing member 37 extends radially inwardly of the remaining portions of the S-fold, and terminates in an inner edge 40 from which a plurality of locking tabs 41 project. The tabs are located substantially within the circular void formed by the ceiling members 31, 35 and 37, so that in uninstalled condition, the total height of the device 30 need not be significantly greater than that occupied by the S-fold.

The tabs 41 include an outer surface 42, a portion of which is engaged by a cylindrical staking tool 43, as well as an inner surface 44. At the point of interconnection with the edge 40, each tab include a slightly arcuate portion 45, as well as a linear portion 46. From a comparison between FIGS. 3 and 4, it will be observed that with engagement of the staking tool, and the exertion of pressure against the inner edge 40 and surface 42, the major portion of bending occurs at the second bent portion 36, owing to the fact that the member 37 is initially of generally arcuate configuration. Thus, substantially no bending of the tabs occurs at the edge 40, and at the completion of the staking operation, the member 37 and the tabs 42 closely conform to the configuration of the undersurface 50 of the plug body 51 and the fillet 52 which interconnects the plug body with the undercut threaded shank.

I wish it to be understood that I do not consider the invention limited to the precise details of structure shown and set forth in this specification, for obvious modifications will occur to those skilled in the art to which the invention pertains.

I claim:

1. The method of permanently installing in captive relation a compressible annular spark plug gasket upon a spark plug having a threaded shank thereon and an undercut portion which is free of threads at an inner end of said shank comprising the steps of:

(a) Providing an annular gasket having a principal axis of compression, said gasket including a sealing element including a cross-section an S-shaped sealing member with a radially inwardly extending portion adapted to abut the undercut portion of said shank, and extending radially inwardly of said S-shaped sealing member; said gasket having a plurality of elongated locking tabs extending inwardly from an inner edge of said radially extending portion at an angle thereto to position said locking tabs within a circular void formed by said S-shaped sealing member;

(b) Placing said gasket concentrically upon said threaded shank in the area of said undercut portion thereof, such that said radially extending portion abuts the body of said spark plug and said locking tabs overlie said undercut portion of said shank;

(c) Providing a tool having an operative surface of effective diameter corresponding substantially to the inner diameter of said radially inwardly extending portion; and (d) Mechanically deforming said inwardly extending portion to place said locking tabs into said undercut area to captivate said gasket upon said spark plug.

2. In the method of claim 1, the further step of forming the sealing member to which the locking tabs are attached to arcuate profile, whereby upon staking, pivoting occurs at the outer periphery thereof with an absence of relative movement between the locking tabs and the inner edge of said member.

* * * * *